US010938979B1

(12) United States Patent
Dave et al.

(10) Patent No.: US 10,938,979 B1
(45) Date of Patent: Mar. 2, 2021

(54) GENERATING AND DISPLAYING CUSTOM-SELECTED CONTENT IN A MOBILE DEVICE APPLICATION

(71) Applicant: FMR LLC, Boston, MA (US)

(72) Inventors: Neha Dave, Bengaluru (IN); Samir Kakkar, Bangalore (IN); Vijai Kishan Radhakrishnan, Bangalore (IN); Nilesh Goel, Kolkata (IN); Mandeep Makkar, Bangalore (IN); Joseph Menezes, Bengaluru (IN); Diksha Arora, Kurukshetra (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/816,091

(22) Filed: Mar. 11, 2020

(51) Int. Cl.
*H04M 1/725* (2006.01)
*G06F 16/906* (2019.01)
(Continued)

(52) U.S. Cl.
CPC ...... *H04M 1/72569* (2013.01); *G06F 16/906* (2019.01); *G06F 16/909* (2019.01); *H04M 1/72572* (2013.01); *H04N 21/8126* (2013.01)

(58) Field of Classification Search
CPC ....... H04L 67/306; H04L 67/22; H04L 67/34; H04L 41/147; H04L 67/18; H04L 41/0813; H04L 65/4084; H04L 67/025; H04L 67/1021; H04L 67/28; H04L 67/2823; H04L 41/0843; H04L 41/0853; H04L 43/08; H04L 63/1425; H04L 67/12; H04L 67/303; H04L 51/046; H04L 12/16; H04L 41/22; H04L 51/06; H04L 41/0806; H04L 41/0823; H04L 41/0876; H04L 41/5003; H04L 41/5025; H04L 41/5054;
(Continued)

(56) References Cited

U.S. PATENT DOCUMENTS

2014/0157255 A1* 6/2014 Chan ................ H04L 43/04
717/177
2015/0170053 A1 6/2015 Miao
(Continued)

OTHER PUBLICATIONS

"Automated User Interface Generation Involving Field Classification" by Tomasek et al., dated Jan. 31, 2017 (Year: 2017).*
(Continued)

*Primary Examiner* — Daniel Lai
(74) *Attorney, Agent, or Firm* — Proskauer Rose LLP (57) ABSTRACT

Methods and apparatuses are described for generating and displaying custom-selected content for a mobile application. A mobile device captures a request to launch an application and determines content cards eligible to be displayed. A user-specific content classification model is generated for selecting one of the content cards to be displayed, where the mobile device identifies historical usage characteristics and transmits the historical usage characteristics to a server, which generates the user-specific content classification model based upon the historical usage characteristics and transmits the user-specific content classification model to the mobile device. The mobile device executes the user-specific content classification model to select one or more content cards to be displayed and launches the application to display the selected content cards.

22 Claims, 7 Drawing Sheets

(51) Int. Cl.
  *H04N 21/81* (2011.01)
  *G06F 16/909* (2019.01)
(58) Field of Classification Search
  CPC ....... H04L 51/063; H04L 51/20; G06N 20/00;
    G06N 3/08; G06N 5/04; G06N 20/20;
    G06N 3/126; G06N 3/0445; G06N 3/063;
    G06N 5/047; G06F 3/0482; G06F 3/167;
    G06F 3/011; G06F 16/9535; G06F 9/451;
    G06F 16/40; G06F 21/554; G06F 3/017;
    G06F 21/316; G06F 11/3438; G06F 8/77;
    G06F 16/906; G06F 16/909; H04W 4/50;
    H04W 48/04; H04W 4/12; H04W 4/02;
    H04W 4/00; H04W 4/023; H04W 4/025;
    H04M 1/72569; H04M 1/72572; H04N
    21/8126
  See application file for complete search history.

(56) References Cited

U.S. PATENT DOCUMENTS

| 2016/0164974 | A1* | 6/2016 | Lavee | G06Q 30/0251 |
| | | | | 707/722 |
| 2018/0025287 | A1* | 1/2018 | Mathew | G06N 5/04 |
| | | | | 706/12 |
| 2018/0336415 | A1* | 11/2018 | Anorga | G06K 9/00671 |
| 2019/0050746 | A1 | 2/2019 | Sanketi et al. | |
| 2019/0086988 | A1 | 3/2019 | He et al. | |

OTHER PUBLICATIONS

"An adaptable UI/UX considering user's cognitive and behavior information in distributed environment" by Ji et al., dated Jul. 1, 2017 (Year: 2017).*

* cited by examiner

| Current Card | Next Card | Location | Time of Day | Day of Week | Time Spent | Type of View |
|---|---|---|---|---|---|---|
| CountDown | Qualtrics | Home | 18:21 | Thursday | 95 | detail |
| Futures | Futures | Office | 18:16 | Friday | 100 | detail |
| Login | Markets World | Travel | 15:02 | Sunday | 33 | detail |
| Messages | Open Folio | Home | 19:49 | Monday | 16 | glance |
| Login | Open Folio | Office | 00:26 | Wednesday | 65 | detail |
| Webinar | Open Folio | Home | 05:15 | Saturday | 63 | glance |

GENERATING AND DISPLAYING CUSTOM-SELECTED CONTENT IN A MOBILE DEVICE APPLICATION

TECHNICAL FIELD

This application relates generally to methods and apparatuses, including computer program products, for generating and displaying custom-selected content in a mobile device application.

BACKGROUND

As mobile devices have become the preferred way for many people to consume content and gain access to information, it has become important to provide these users with personalized, custom-selected content to drive continued user engagement with apps and functionality on the mobile devices. Generally, present techniques for generated personalized content on mobile devices lack robust mechanisms for automatically predicting which content items are most likely to be viewed and/or interacted with by the user, especially considering the user's prior usage history with respect to the application and with certain types of content items.

Recently, advances in machine learning have enabled the use of complex content classification and recommendation models where the selection of content items can be tailored to a specific user's preferences and history. However, the generation, re-training, and execution of such content classification and recommendation models is time-consuming and requires significant computer processing power—making it difficult to provide such functionality on mobile devices. In addition, most of these types of content classification and recommendation models require a large corpus of input data each time the model is generated or re-trained in order to provide accurate recommendations—which, again, is typically not feasible for use on mobile devices, where processor power and memory storage can be limited. Furthermore, traditional Recommendation Systems typically do not consider user group (persona), time, day and location as relevant data elements to making a recommendation, as most of them use content-based or collaborative-filtering-based algorithms. Accuracy and recall (e.g., the evaluation matrix) are low with these traditional systems when taking into account a pool of all users for recommendation.

SUMMARY

Therefore, what is needed are methods and systems for generating and providing user-specific, personalized content recommendations for display to users on mobile devices based upon the user's historical usage pattern with respect to previously displayed content. The techniques described herein advantageously provide for such personalized content recommendations through the use of a wide and deep machine learning model coupled with transfer learning for resource- and bandwidth-efficient generation, re-training, and deployment of user-specific recommendation models to mobile devices. Furthermore, the methods and systems described herein continuously capture a user's usage history and patterns with respect to content items, along with seasonality of the underlying usage history and patterns, and seamlessly integrate this usage data into the user-specific classification model—thereby providing an improved and dynamic methodology for providing content recommendations to users of mobile devices.

The invention, in one aspect, features a computerized method of generating and displaying custom-selected content for a mobile device application. A mobile computing device captures a request to launch an application located on the mobile computing device, the application comprising one or more areas to display custom-selected content. The mobile computing device determines a plurality of content cards eligible to be displayed in the one or more areas. A user-specific content classification model is generated for selecting one of the plurality of content cards to be displayed in the one or more areas, where: the mobile computing device identifies historical usage characteristics associated with the application and transmits the historical usage characteristics to a server computing device; the server computing device generates the user-specific content classification model based upon the historical usage characteristics; and the server computing device transmits the user-specific content classification model to the mobile computing device. The mobile computing device executes the user-specific content classification model to select one or more of the plurality of content cards to be displayed in the one or more areas. The mobile computing device launches the application based upon the request, wherein the application displays the selected one or more content cards in the one or more areas upon launching.

The invention, in another aspect, features a system for generating and displaying custom-selected content for a mobile device application. The system includes a mobile computing device comprising a memory for storing computer-executable instructions and a processor that executes the computer-executable instructions. The system includes a server computing device coupled to the mobile computing device and comprising a memory for storing computer-executable instructions and a processor that executes the computer-executable instructions. The mobile computing device captures a request to launch an application located on the mobile computing device, the application comprising one or more areas to display custom-selected content. The mobile computing device determines a plurality of content cards eligible to be displayed in the one or more areas. A user-specific content classification model is generated for selecting one of the plurality of content cards to be displayed in the one or more areas, where: the mobile computing device identifies historical usage characteristics associated with the application and transmits the historical usage characteristics to a server computing device; the server computing device generates the user-specific content classification model based upon the historical usage characteristics; and the server computing device transmits the user-specific content classification model to the mobile computing device. The mobile computing device executes the user-specific content classification model to select one or more of the plurality of content cards to be displayed in the one or more areas. The mobile computing device launches the application based upon the request, wherein the application displays the selected one or more content cards in the one or more areas upon launching.

Any of the above aspects can include one or more of the following features. In some embodiments, the historical usage characteristics comprise an identification of a current content card displayed in the application, a location of the mobile computing device when the current content card is displayed in the application, a date when the current content card is displayed in the application, a time of day and a day of the week when the current content card is displayed in the application, an amount of time that the current content card is displayed in the application, a view type associated with the current content card displayed in the application, or an identification of a content card to be displayed next in the application. In some embodiments, the historical usage characteristics are derived from one or more log files stored on the mobile computing device.

In some embodiments, generating a user-specific content classification model based upon the historical usage characteristics comprises: determining a baseline classification model based upon an identify of a user of the mobile computing device, the baseline classification model associated with a plurality of users that have one or more characteristics in common with the user of the mobile computing device; modifying the baseline content classification model to remove an output layer of the baseline classification model and insert a new output layer comprising randomized values in place of the removed output layer; and re-training the baseline content classification model using the historical usage characteristics to generate the user-specific content classification model. In some embodiments, the user-specific content classification model is a wide and deep model.

In some embodiments, executing the user-specific content classification model generates a selection of a content card predicted to have a highest user interaction probability. In some embodiments, the content card predicted to have the highest user interaction probability is selected for display in the one or more areas of the application.

In some embodiments, the mobile computing device captures usage characteristics associated with the application when the selected one or more content cards are displayed in the application, transmits the usage characteristics to the server computing device, and the server computing device re-trains the user-specific content classification model using the usage characteristics. In some embodiments, the usage characteristics comprise an identification of the selected one or more content cards displayed in the application, a location of the mobile computing device when the selected one or more content cards are displayed in the application, a date when the selected one or more content cards are displayed in the application, a time of day when the selected one or more content cards are displayed in the application, a day of the week when the selected one or more content cards are displayed in the application, an amount of time that the selected one or more content cards are displayed in the application, a view type associated with the selected one or more content cards displayed in the application, or an identification of a content card to be displayed next in the application.

In some embodiments, the plurality of content cards eligible to be displayed in the one or more areas comprise a ranked list of the plurality of content cards. In some embodiments, the mobile computing device selects another one or more content cards for display in the one or more areas after a predetermined time has elapsed during use of the application, and displays the another one or more content cards in the one or more areas.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
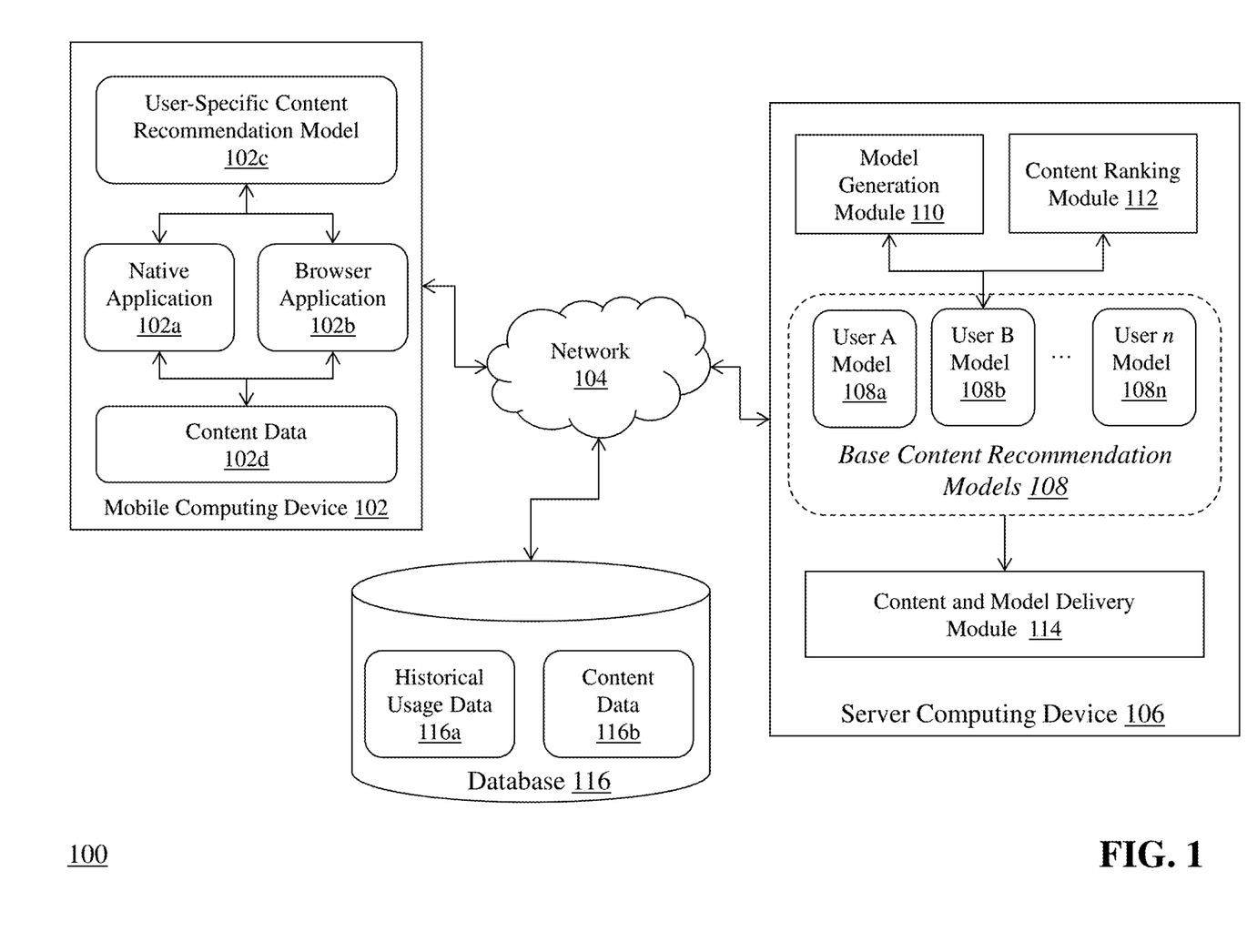
FIG. 1 is a block diagram of a system for generating and displaying custom-selected content in a mobile device application.

FIG. 1 is a block diagram of a system 100 of generating and displaying custom-selected content in a mobile device application. The system 100 includes a mobile computing device 102 that includes a native application 102a, a browser application 102b, and a user-specific content recommendation model 102c. The mobile computing device 102 also stores content data 116b for use by the native application 102a and/or the browser application 102b. The system 100 further includes a communications network 104. The system further includes a server computing device 106 that includes a plurality of base content recommendation models 108a-108n, a model generation module 110, a content ranking module 112, and a content and model delivery module 114. The system further includes a database 116 that includes historical usage data 116a relating to past usage of the mobile computing device 102 with respect to the personalized content recommendations, and content data 116b.

The mobile computing device 102 connects to the communications network 104 in order to communicate with the server computing device 106 to provide input and receive output relating to the process of generating and displaying custom-selected content in a mobile device application as described herein. The mobile computing device 102 is coupled to a display device (not shown). For example, mobile computing device 102 can provide a graphical user interface (GUI) via the display device that is configured to receive input from a user of the device 102 and to present output to the user that results from the methods and systems described herein.

Exemplary mobile computing devices 102 include but are not limited to tablets, laptop computers, smartphones, smart watches, and internet of things (IOT) devices. It should be appreciated that other types of computing devices (e.g., desktop computers, smart appliances) that are capable of connecting to the components of the system 100 can be used without departing from the scope of invention. Although FIG. 1 depicts a single mobile computing device 102, it should be appreciated that the system 100 can include any number of mobile computing devices operated by the same user or operated by different users.

The native application 102a is a software application (also called an 'app') that is installed locally on the mobile device 102 and written with programmatic code designed to interact with an operating system that is native to the mobile device 102. Such software is available from, e.g., the Apple® App Store or the Google® Play Store. In some embodiments, the native application 102a includes a software development kit (SDK) module that is executed by a processor of the mobile device 102 to perform functions associated with generating and displaying custom-selected content as described herein.

The browser application 102b comprises software executing on a processor of the mobile device 102 that enables the mobile device to communicate via HTTP or HTTPS with remote servers addressable with URLs (e.g., web server 108) to receive website-related content, including one or more webpages, for rendering in the browser application and presentation on a display device coupled to the mobile device 102. Exemplary mobile browser application software includes, but is not limited to, Firefox™, Chrome™, Safari™, and other similar software. The one or more webpages can comprise visual and audio content for display to and interaction with a user.

The user-specific content recommendation model 102c is a machine-learning recommendation model that is stored locally on the mobile device 102, and the model 102c is configured to select one or more items of digital content (i.e., content data 102d) to be displayed to the user via the native application 102a and/or the browser application 102b on the mobile device 102. As will be described in greater detail below, the user-specific content recommendation model 102c is generated by the server computing device 106 and periodically transmitted to the mobile device 102. In some embodiments, the user-specific content recommendation model 102c is a TensorFlow™ Lite model file (e.g., .tflite file) that is executed by a processor of the mobile device 102 to generate content recommendations for the specific user of the mobile device 102 based upon, e.g., information known about the user—including but not limited to the user's historical usage of certain apps and items of digital content (e.g., what types of content items has the user viewed and/or interacted with, what is the duration that the user has viewed and/or interacted with certain content items, what time of day has the user viewed and/or interacted with certain content items, and so forth).

The content data 102d comprises items of digital content (e.g., text articles, webpages, HTML code, XML code, graphics, ads, links, video, audio) for display to the user of the mobile device 102 via the native application 102a and/or the mobile application 102b. In certain embodiments, the items of digital content comprise content cards (also called 'feed cards'), which are content items that are displayed in at least a portion of the user interface of the mobile device 102 upon launching of the native application 102a and/or the browser application 102b. In some embodiments, the content cards provide an informational message, an alert, or an action item for the user of the mobile device 102, and typically the content card relates to the underlying application is executed. For example, a user may launch a financial brokerage application (e.g., native app 102a) on his or her mobile device 102, which executes the user-specific content recommendation model 102c to determine one or more content cards stored in the content data 102d that should be displayed to the user upon opening the native app, based upon the user profile and/or the user's historical usage of the native app and related content cards. Further detail on this process is provided below.

The communications network 104 enables the mobile computing device 102 to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for generating and displaying custom-selected content in a mobile device application as described herein. The server computing device 106 includes a plurality of user-specific content recommendation models 108a-108n, collectively 108 (i.e., one model for each user of a mobile device that accesses the system), a model generation module 110, a content ranking module 112, and a content and model delivery module 114 that execute on the processor of the server computing device 106. In some embodiments, the models 108, and modules 110, 112, 114 are specialized sets of computer software instructions programmed onto one or more dedicated processors in the server computing device 106 and can include specifically-designated memory locations and/or registers for executing the specialized computer software instructions.

Although the classification models 108 and the computing modules 110, 112, 114 are shown in FIG. 1 as executing within the same server computing device 106, in some embodiments the functionality of the models 108 and the computing modules 110, 112, 114 can be distributed among a plurality of server computing devices. As shown in FIG. 1, the server computing device 106 enables the models 108 and the modules 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the user-specific content recommendation models and the computing modules 110, 112, 114 is described in detail below.

The database 116 is a computing device (or in some embodiments, a set of computing devices) coupled to the server computing device 106 (in some embodiments, via communications network 104) and is configured to receive, generate, and store specific segments of data relating to the process of generating and displaying custom-selected content in a mobile device application as described herein. In some embodiments, all or a portion of the database 116 can be integrated with the server computing device 106 or be located on a separate computing device or devices. The database 116 can comprise one or more databases configured to store portions of data used by the other components of the system 100, as will be described in greater detail below. In one example, the database 116 can comprise a database such as MySQL™ available from Oracle Corp. of Redwood City, Calif. In another example, the database 116 can be based upon a platform such as Cassandra™ available from The Apache Software Foundation (http://cassandra.apache.org/). Other types of 'big data,' scalable databases and/or customized database frameworks can be used within the scope of the technology described herein.

The database 116 includes historical usage data 116a, which relates to the usage of the mobile computing device apps and related content cards displayed to users of the mobile devices—such as which content cards were displayed to which users, how long the users viewed certain content cards, whether the users interacted with certain content cards, what time of day users viewed and/or interacted with certain content cards, and the like. In some embodiments, the mobile computing device 102 can capture the historical usage data and store it locally on the mobile device 102—then periodically transmit the historical usage data to the database 116 (e.g., on a weekly basis). In some embodiments, the mobile computing device 102 continually transmits the historical usage data to the database 116 as soon as the data is captured. The database 116 also includes content data 116a, which as described above comprises the specific items of digital content to be displayed to one or more users of mobile computing devices. Further detail on the database 116 and associated historical usage data 116a and content data 116b is provided below.

Figure 2:
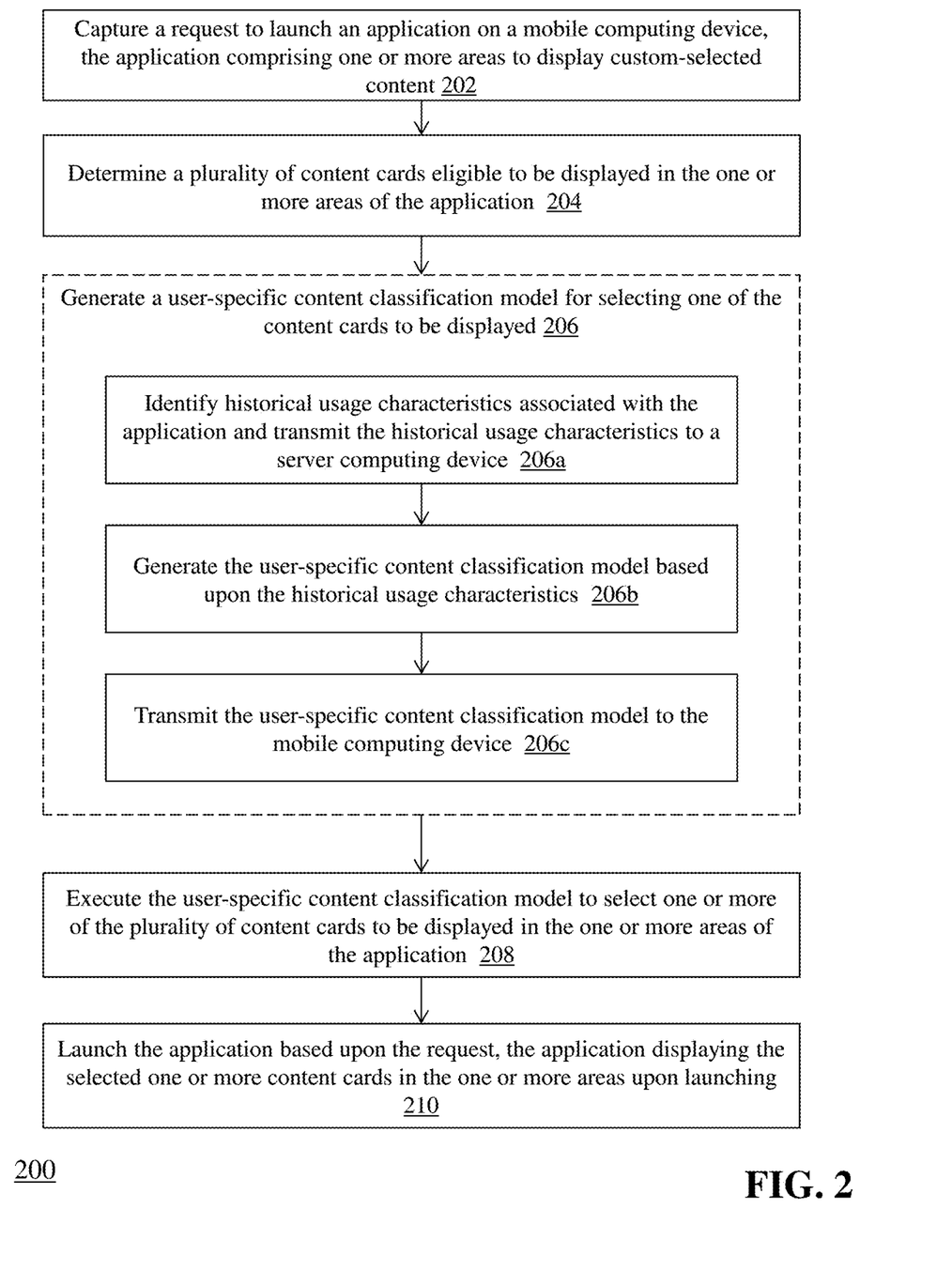
FIG. 2 is a flow diagram of a computerized method of generating and displaying custom-selected content in a mobile device application.

FIG. 2 is a flow diagram of a computerized method of generating and displaying custom-selected content in a mobile device application, using the system 100 of FIG. 1. The mobile computing device 102 captures (202) a request to launch an application on the mobile device, where the application comprises one or more areas to display custom-selected content. For example, a user of mobile device 102 can click on the native application 102a and/or the browser application 102b to access functionality of said application, and the operating system of mobile device 102 can capture the user action. As mentioned above, the native application 102a and browser application 102b are typically configured to display a user interface that includes one or more items of digital content—including but not limited to content cards—upon launching. In some embodiments, the native app 102a and browser app 102b can incorporate one or more areas of the mobile device screen as reserved for content cards, or in other embodiments, the native app 102a and browser app 102b can generate a pop-up window, additional window, or other type of overlay in which the content cards will be displayed to the user.

Next, upon detecting execution of the native app 102a and/or the browser app 102b, the mobile computing device 102 determines (204) a plurality of content cards eligible to be displayed in the one or more areas of the application. In some embodiments, the mobile device 102 executes the user-specific content recommendation model 102c as part of this step. The user-specific content recommendation model 102c generates an identification of one or more content cards to be displayed to the user of mobile device 102 when the corresponding app has completed launching. For example, the model 102c can generate a linked list of content cards (as stored in content data 102d) based upon a context of the app execution (e.g., time of day, user location, user interaction history, and the like), where the linked list comprises a plurality of content cards and designation of order in which the content cards should be displayed. The model 102c can then provide the linked list to the app 102a/102b which was executed, for display to the user in the area(s) provided. In some embodiments, the model 102c and/or the mobile device 102 can exclude certain content cards from being displayed to the user based upon a variety of considerations, such as the user's viewing and/or interaction history with respect to those specific content cards (or similar types of content cards) or the context in which the underlying app is being executed—such as excluding content cards that are intended to be shown in the evening when the user launches the app in the morning, etc.

As mentioned above, in some embodiments the mobile device 102 can determine which content card(s) should be displayed and then display the corresponding card(s) in the related app 102a/102b using the model 102c and content data 102d stored locally. However, it is beneficial to periodically generate an updated model 102c based upon usage data for the specific user, as captured by the mobile device 102 over time, to ensure that the content cards being recommended to the user are predicted to have a high likelihood of user viewing and/or interaction—thereby increasing the effectiveness of the content delivery.

Figure 3:
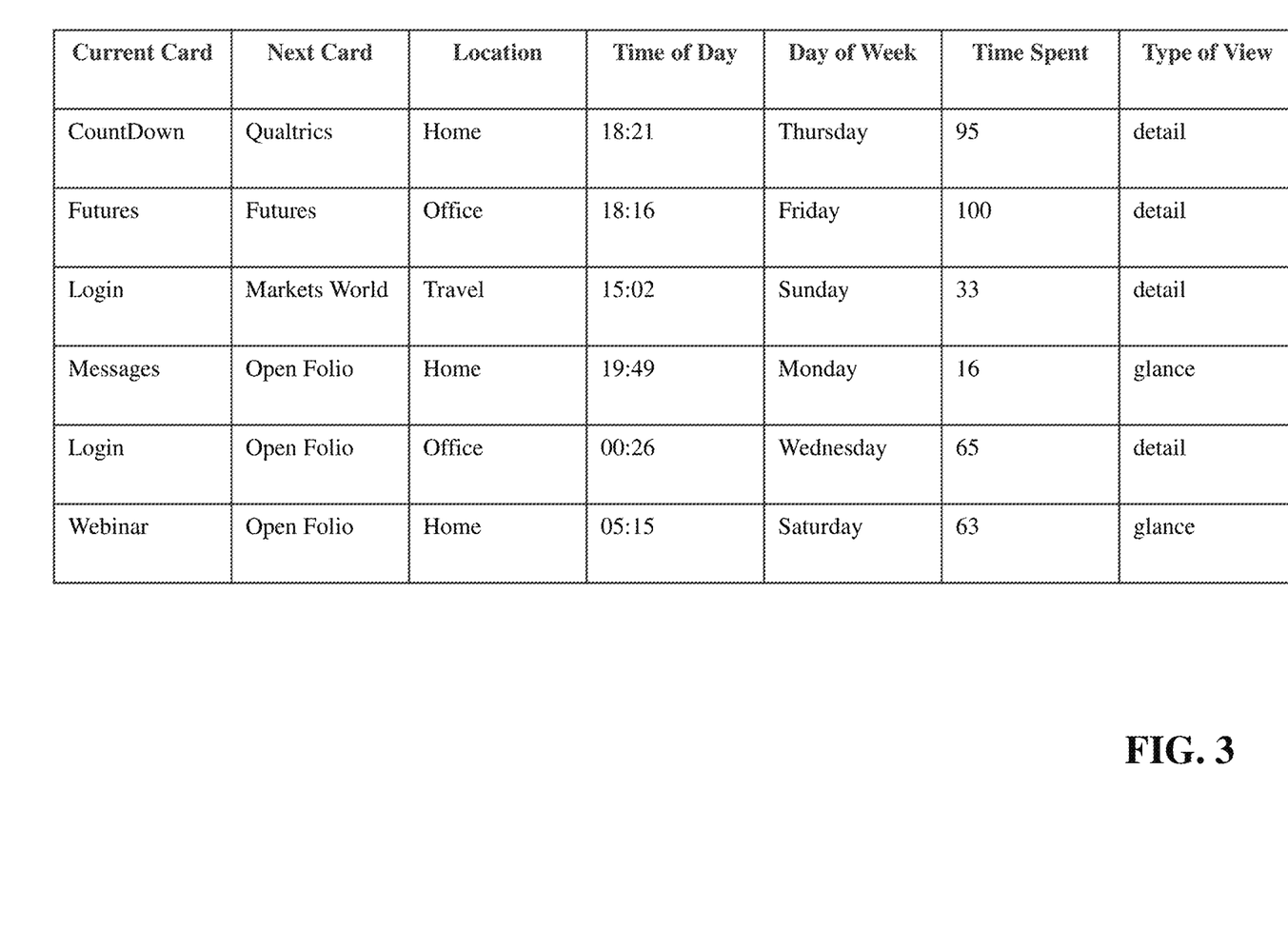
FIG. 3 is a table of exemplary historical usage characteristics that are captured by the mobile device.

Therefore, the system 100 generates (206) a user-specific content classification model (i.e., model 102c) for selecting one or more of the content cards to be displayed, as follows. The mobile device 102 identifies (206a) historical usage characteristics associated with the application(s) 102a/102b and transmits the historical usage characteristics to the server computing device 106. As noted previously, the historical usage characteristics relate to the user's prior viewing, interaction, or other action with respect to content cards displayed in the app. FIG. 3 is a table of exemplary historical usage characteristics that are captured by the mobile device 102. As shown in FIG. 3, the table comprises a plurality of rows, each row corresponding to a usage of the corresponding application by the user of mobile device 102. The data in the table of FIG. 3 is as follows:

Current Card: the type of content card presented to the user—in one embodiment, there are twenty different types of cards: [Account Open Promo=1, App Message=2, Balance=3, BullBear=4, CountDown=5, Futures=6, Free Trade=7, Login=8, Market Snacks=9, Markets World=10, Markets US=11, Messages=12, News Topic=13, Open Folio=14, Qualtrics=15, Promo=16, Program Start=17, Symbol card=18, ViewPoint=19, Webinar=20];

Next Card: the type of content card that will be presented next in sequence (e.g., as referenced in the linked list described above);

Location: where the user is located when executing the app—in some embodiments, the mobile device 102 can record GPS coordinates or IP address of the user when the app is launched and associate the GPS coordinates or IP address with a known (or preconfigured) location of the user—e.g., Home, Office, Travel;

Time of Day: the time when the user executes the app;

Day of Week: the day of the week when the user executes the app—it should be appreciated that the full date or other type of date/timestamp can be used by the mobile device 102 to record the time at which the app is executed;

Time Spent: the number of seconds that the content card is displayed to the user (i.e., before the user closes the content card, moves to the next content card, moves to other functionality of the app, closes the app, changes apps, etc.);

Type of View: the way in which the user viewed and/or interacted with the content card—e.g., did the user scroll down to view the full content card, did the user click on a link in the content card, did the user spent a certain amount of time looking at the card, etc. In some embodiments, the mobile device 102 can track the user's eye movement and gaze focus to determine that the user was looking at/reading the content card for a certain amount of time.

In some embodiments, the above-referenced historical usage characteristics are stored in a log file on the mobile device 102, and in some cases the log file is associated with the particular application that generated the usage characteristics. It should be appreciated that the mobile device 102 can capture other relevant usage characteristics in the historical data (e.g., device type, device operating system, device hardware ID, etc.).

The mobile device 102 periodically (or in some embodiments, continuously) transmits the historical usage characteristics data to the server computing device 106 for incorporation into the model generation process to create an updated model for the user of mobile device 102 as described below.

Turning back to FIG. 2, the model generation module 110 of server computing device 106 generates (206b) a new user-specific content recommendation model for a new user, or an updated user-specific content recommendation model for an existing user, based upon the historical usage characteristics received from the mobile computing device 102. In some embodiments, the model generation module 110 utilizes a wide and deep learning paradigm to generate the user-specific content recommendation models.

Generally, a content recommendation system is a problem of generalization and memorization. A wide model is associated with memory and a deep model is associated with generalization. Memorization can be defined as learning the frequent co-occurrence of features and exploiting the correlation available in the historical usage data. Generalization, on the other hand, is based on transitivity of correlation and explores new feature combinations that have never or rarely occurred in the past.

If a content recommendation system uses only memorization, then the recommendations can become too repetitive. If a content recommendation system uses only generalization, then the recommendations can become too irrelevant to the user—and thereby the recommendations will not be used. But, the present system 100 combines both generalization and memorization in a wide and deep model structure, which enables the system to achieve highly accurate and personalized recommendations within a generalized set of content items. This results in better engagement of the user with the app.

In some embodiments, the model generation module 110 trains a linear model with cross-lined features and correlates this related data with an assigned label. As a result, the user-specific content recommendation models generated by the module 110 can predict, e.g., given the current content card a user is viewing, the probability of the next content card (P(next card|current card)), for each current content card, that has highest probability (meaning which content card is the user most likely to view or interact with next).

The wide and deep model utilized by the model generation module 110 can be defined as follows (e.g., based upon the historical usage characteristics captured as shown in FIG. 3):
 Continuous variable columns: time of day, day of week, time spent;
 Categorical columns with vocabulary list: current card, location, type of view;
 Transformations/bucketing: time buckets—defined based upon the hour at which the content card was viewed (i.e., 1-23).
The wide model features are chosen as follows:

wide columns=base columns+crossed columns where

| base columns | [current card, location, type of view] [time buckets] |
|---|---|

| crossed columns | [current card, location], hash bucket size = HASH_BUCKET_SIZE [time buckets, current card, day of week] [current card, time of day], hash bucket size = _HASH_BUCKET_SIZE [current card, day of week] |
|---|---|

The deep model features are chosen using the continuous variable columns and a multi-hot representation of a given categorical column:

| deep columns | [time of day] [day of week] [time spent] [current card] [location] [type of view] |
|---|---|

The model generation module 110 can utilize the equation below to determine a probability for the next card, given an input x:

$$P(Y=1|x)=\sigma(w_{wide}^T[x,\phi(x)]+w_{deep}^T a^{(l_f)}+b)$$

where Y=next card (label);
b=bias;
σ(x)=cross product transformations of original features x.

In some embodiments, the click stream raw data consists of information such as: user_id, date, session_id, longitude, latitude, card_id, view_type, interaction_type. The raw data from the clickstream, along with profile data of the user, are then engineered to generate the features as shown in FIG. 3.

The output from the above equation can be a list of recommended content items and associated scores (e.g., 1-10) as shown below:

| Content Item | Score |
|---|---|
| CountDown | 2.331005386 |
| Futures | 2.910053854 |
| Login 1 | 2.661007686 |
| Messages | 3.661005386 |
| Login 2 | 0.661000039 |
| Open Folio | 1.661005386 |
| Markets U.S. | 3.136658954 |
| Webinar | 3.556658945 |
| BullBear | 8.330502693 |
| Markets World | 4.530502693 |

The model generation module 110 uses all of the historical usage data for the specific user as input to the wide and deep model described above to generate a base model (i.e., models 108a-108n) where each base model relates to a specific user. Because the generation and re-training of wide and deep models can be expensive in terms of time and computing resources, it can be prohibitive to continuously generate a user-specific content recommendation model for each user that is based upon the entire corpus of that user's historical usage characteristics, when additional historical usage characteristics for the user are continuously being generated at the mobile device 102 and received at database 116. Therefore, the model generation module 110 can generate and re-train a base content recommendation model 108a-108n for each of a plurality of users at varying intervals (e.g., one month, six months, etc.). For example, the model generation module 110 can run a periodic batch process that generates/re-trains these base models 108a-108n for each user.

It should be appreciated that, in addition to or instead of creating a base model 108a-108n for each specific user, the model generation module 110 can generate a base model for each of a plurality of user personas. In this context, a user persona generally relates to a set of one or more characteristics (i.e., historical usage characteristics, demographic characteristics, etc.) that a plurality of users have in common. The model generation module 110 can use the historical usage characteristics for this group of users as input to generate a base content recommendation model 108a-108n—that can then be adapted as described herein to generate a user-specific content recommendation model (e.g. model 102c) for a specific user within the group.

However, in order to provide users with personalized and dynamic content card recommendations, the model generation module 110 can adapt the base model 108a-108n for the user to generate the user-specific content recommendation model 102c that is then transferred to the mobile device 102. To accomplish this goal, the model generation module 110 fine tunes the selected base model via transfer learning to generate the user-specific model.

Figure 4:
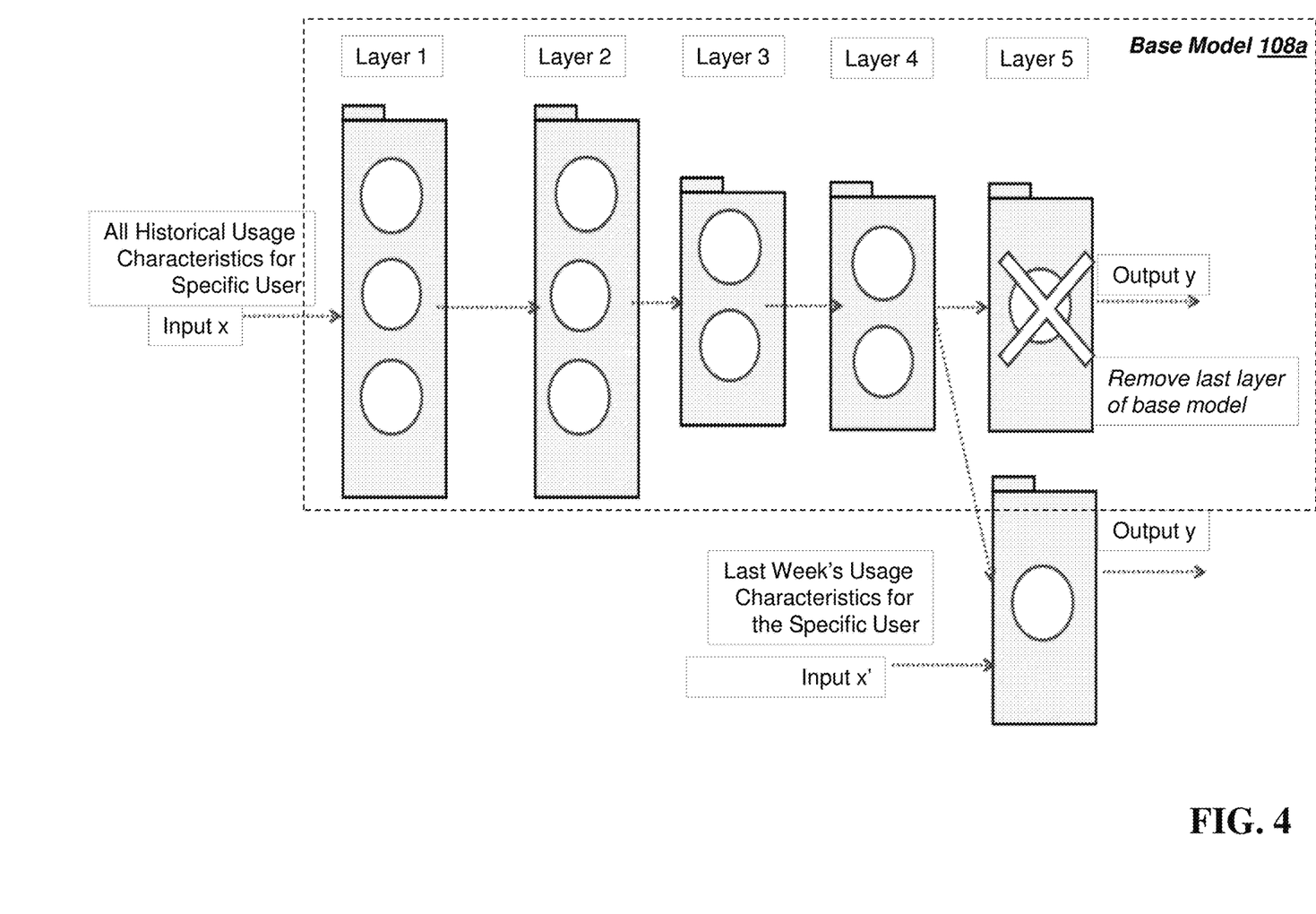
FIG. 4 is a diagram showing how the model generation module adapts a base content recommendation model for a particular user to generate the user-specific content recommendation model.

FIG. 4 is a diagram showing how the model generation module 110 adapts a base content recommendation model (e.g., model 108a) for a particular user to generate the user-specific content recommendation model 102c. As shown in FIG. 4, the base content recommendation model 108a comprises a plurality of layers (for example, in a neural network paradigm), an input layer where the input x to the model is provided (i.e., historical usage characteristics for all users), an output layer where the output from the model is produced, and a plurality of intermediate layers. Each intermediate layer has a plurality of nodes with assigned weight values. Each node in an intermediate layer is connected (using the weight values) to all nodes in the preceding layer and all nodes in the subsequent layer. To generate the user-specific content recommendation model 102c, the model generation module 110 removes the last layer (i.e., the output layer) from the base model 108a, generates randomly initialized weights for the output layer, and retrains the modified base model 108a using as input x' the historical usage characteristics for the specific user for a defined period of time (e.g., last week). It should be appreciated that the input dataset x' is much smaller than the original input dataset x, and therefore the re-training process to generate the user-specific content recommendation model 102c is much faster and requires far less computing resources than originally training the base model 108a.

Generally, the base model 108a is initially built by segregating data by user persona—each persona has a base model (which is a deep learning model) associated with it. The model generation module 110 can use transfer learning to tune/optimize the base model with a limited amount of training data. Below is an algorithm for fine-tuning the output dense layer of the base model 108a to generate a user-specific content recommendation model 102c using specific data:

1) Load user specific training dataset: train_persona_data=preprocess_input(persona_dataset);
2) Load base model 108a weights without the output layer: model=BaseModel (weights='personaBaseModel', include_top='false');
3) Extract features from the training dataset: persona_featureset=model.predict(train_persona_data);
4) Flatten the layers and create input X and Y for PersonaModel: train_X=persona_featureset.reshape( ), train_Y=train['label']);
5) Add output layer and randomly initialize weights with activation function as 'softmax';
6) Train PersonaModel: model.fit(train_X, train_Y).

Turning back to FIG. 2, the model generation module 110 transfers the generated user-specific content recommendation model to the content and model delivery module 114. The module 114 transmits (206c) the user-specific content recommendation model to the mobile computing device 102. For example, the module 114 can transmit the user-specific model to the mobile device 102 when the model is generated, when the underlying app that uses the model is executed, and/or during a regularly-scheduled download process. In addition, in some embodiments, the content and model delivery module 114 can query the database 116 for new or previously unused content cards that should be transferred to the mobile device 102, and the module 114 can retrieve those content cards and transmit them to the mobile device 102 along with, or independently of, the generated user-specific content recommendation model. As noted above, in some embodiments, the user-specific content recommendation model comprises a TensorFlow™ Lite file (.tflite) that is received and stored on the mobile device 102.

The mobile computing device 102 then executes (208) the user-specific content classification model 102c (e.g., using software installed on the mobile device 102, such as TensorFlow™ Lite) to generate a recommendation of which content card(s) should be displayed to the user upon launching the corresponding application 102a/102b. As set forth above, the model 102c can generate a linked list of content cards to be displayed in one or more areas of the app 102a/102b, and then the mobile device 102 can use the linked list to retrieve the corresponding content cards from the content data repository 102d on the device itself and/or from the content data 116b on database 116. Then, the mobile device 102 launches (210) the application 102a/102b based upon the earlier request to launch the application, and the application 102a/102b can display the selected content cards in the related areas of the application upon launching.

Figure 5:
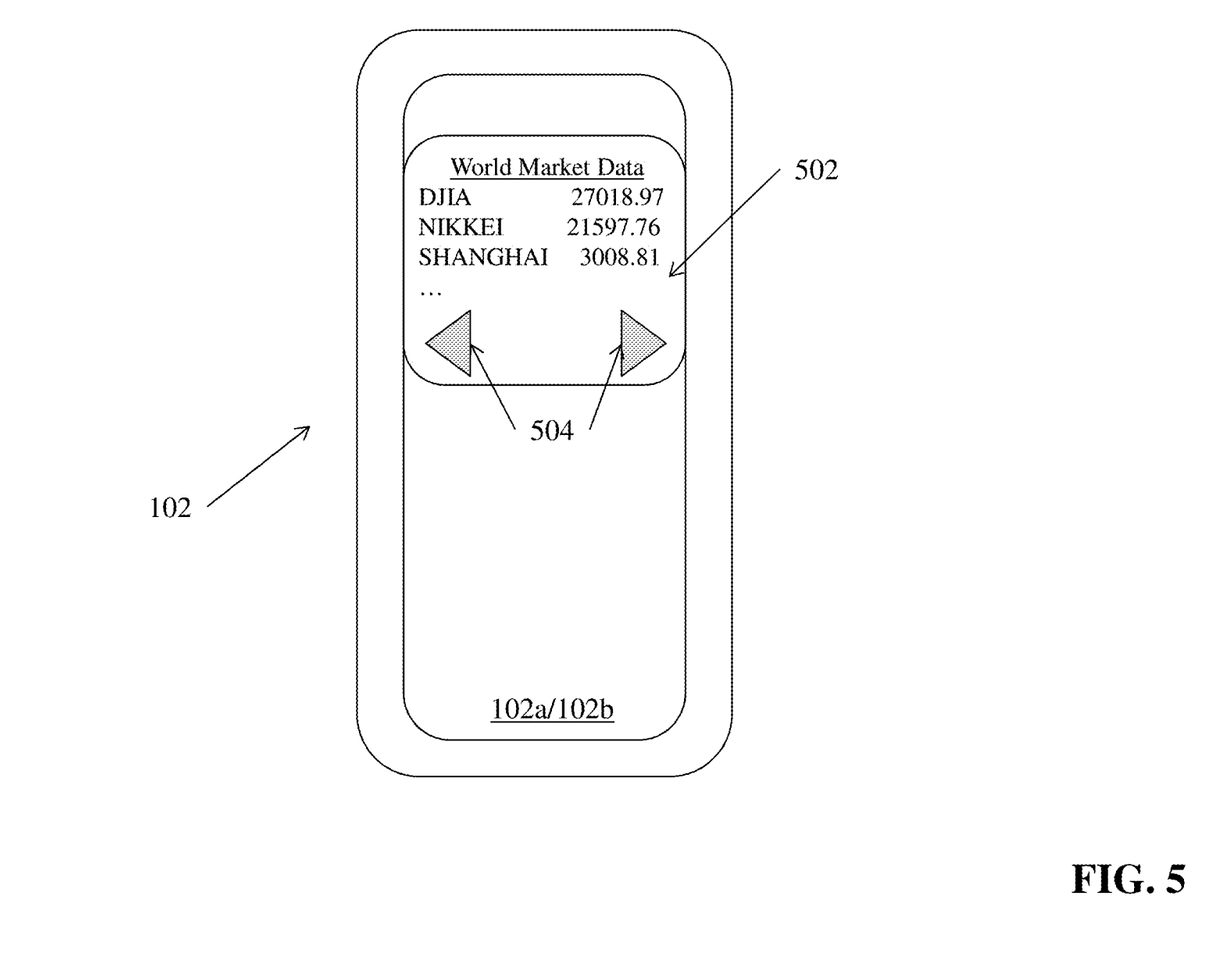
FIG. 5 is an exemplary user interface showing the display of a content card selected by the user-specific content recommendation model and presented by the application on the mobile device.

FIG. 5 is an exemplary user interface showing the display of a content card selected by the user-specific content recommendation model 102c and presented by the application 102a/102b. As shown in FIG. 5, the content card 502 is displayed in an upper portion of the screen and includes world market data (such as index values and the like). The content card 502 also includes navigation arrows 504 for the user to move between different content cards.

Figure 6A:
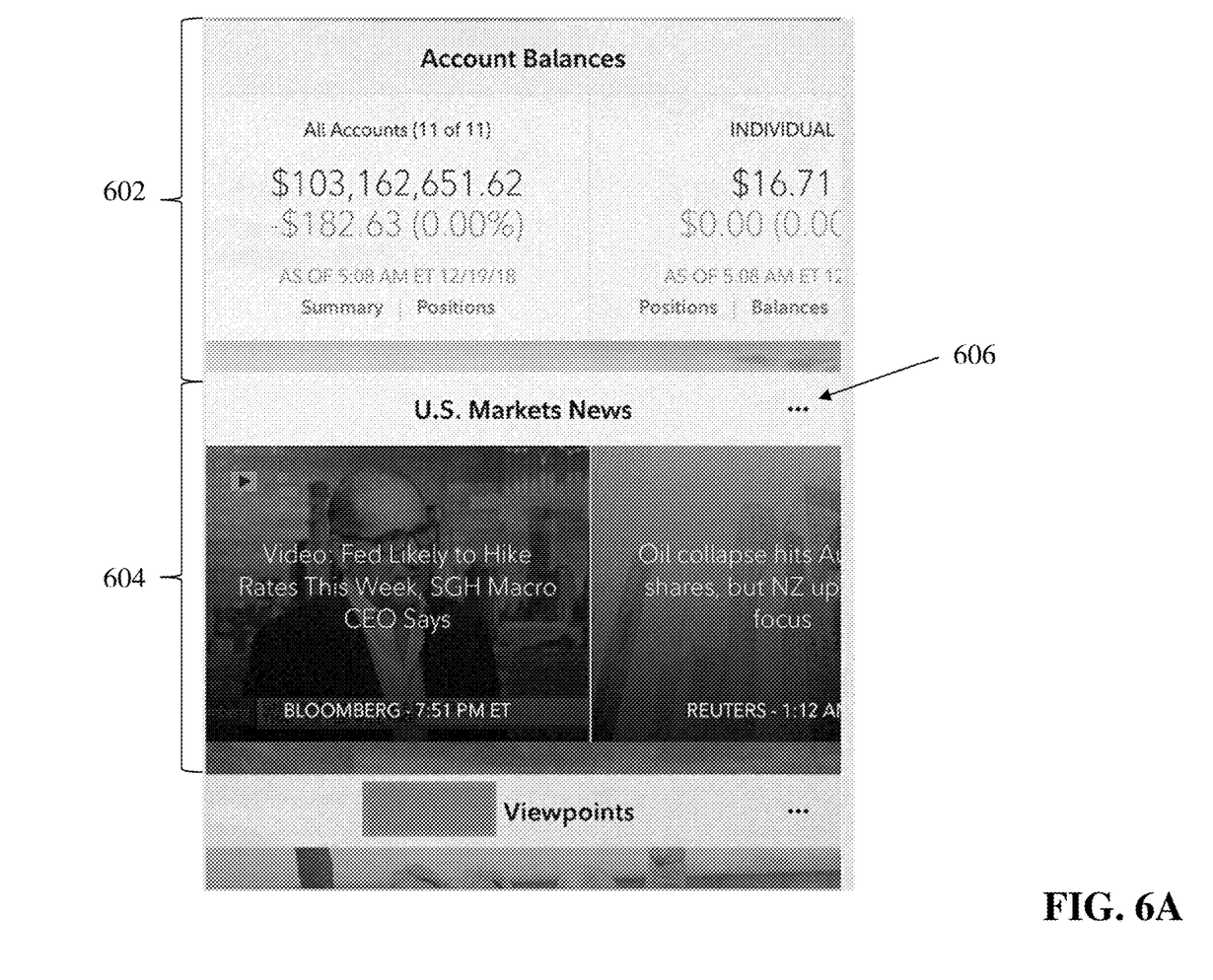
FIG. 6A is a screenshot of an exemplary user interface showing the display of a content card.

FIG. 6A is a screenshot of an exemplary user interface showing the display of a content card. As shown in FIG. 6A, the user interface includes a section 602 with content cards that display account balances for a user of the mobile computing device 102 (e.g., an account holder). The user interface further includes a section 604 with a content card relating to general news items for United States markets. Certain types of content cards, such as the U.S. Market News content card in section 604, can include additional content options available for selection by the user of the mobile computing device 102. The additional content options can be accessed by selecting the button 604.

Figure 6B:
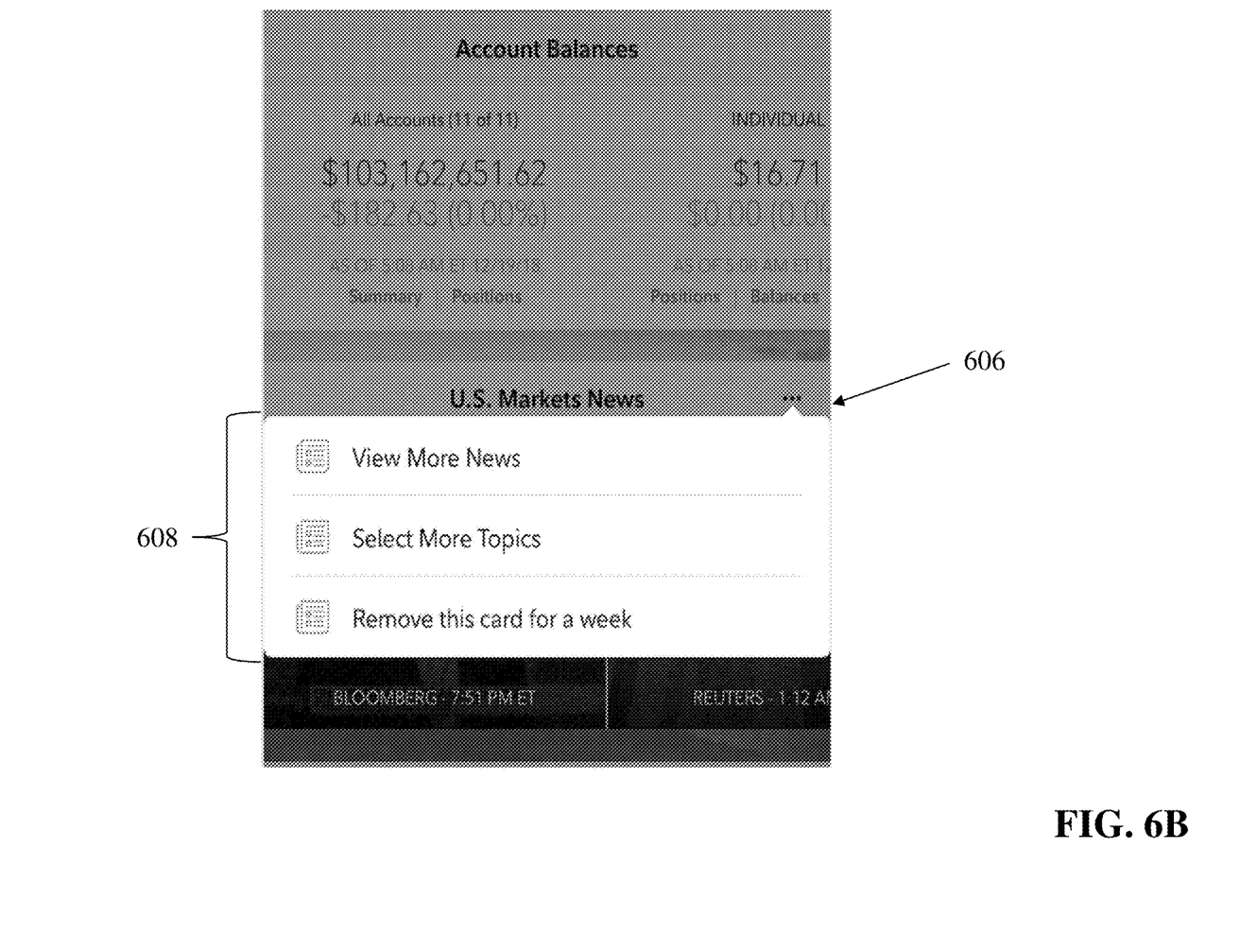
FIG. 6B is a screenshot of the exemplary user interface of FIG. 6A showing an additional content options menu associated with a content card.

FIG. 6B is a screenshot of the exemplary user interface of FIG. 6A, further showing the additional content options menu 608 accessed by selecting button 604. As shown in FIG. 6B, the additional content options menu 608 comprises a plurality of content-related display options—such as 'View More News,' 'Select More Topics,' and 'Remove this card for a week.' Using the options menu 608, the user can customize the spectrum of content that is displayed in the content card(s) for section 604, as well as having the ability to mute or remove a certain content card for a predetermined period of time.

The server computing device 106 further includes a content ranking module 112 that can be used in some embodiments to provide a ranking for the plurality of content cards to be displayed on the mobile device 102. Although FIG. 1 shows the content ranking module 112 located on the server computing device 106, it should be appreciated that the functionality described herein for the module 112 can be located on the mobile device 102. The content ranking module 112 executes an algorithm that prioritizes the display order for the content cards based upon historical factors, including but not limited to time spent. For example, the content ranking module 112 can perform the following steps on, e.g., a linked list of content cards as generated by the user-specific content recommendation model 102c:

1. Sort the content cards in decreasing order;
2. PartitionAvgTS=average time spent (avgTS) of the last content card of the list;
3. Partition the list: ListA[avgTS] >=PartitionAvgTS and ListB[avgTS]<PartitionAvgTS;
4. Multiply all elements of ListA with its index i: RankValue[i]=ListA[i] * i;
5. Create List[RankedCard] with content cards sorted by highest to lowest RankValue;
6. Return List[RankedCard].

Using the ranked list, the mobile device 102 can provide content cards to the user in a sequence or priority where the content cards that have the highest average time spent (meaning these cards are potentially more interesting to a user) are presented before content cards that have a lower average time spent.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), BLUETOOTH®, near field communications (NFC) network, WI-FI®, WIMAX®, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., CHROME™ from Google, Inc., MICROSOFT® INTERNET EXPLORER® available from Microsoft Corporation, and/or MOZILLA® FIREFOX® available from Mozilla Corporation). Mobile computing devices include, for example, a BLACKBERRY® from Research in Motion, an IPHONE® from Apple Corporation, and/or an ANDROID™-based device. IP phones include, for example, a CISCO® Unified IP Phone 7985G and/or a CISCO® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of generating and displaying custom-selected content for a mobile device application, the method comprising:
  capturing, by a mobile computing device, a request to launch an application located on the mobile computing device, the application comprising one or more areas to display custom-selected content;
  determining, by the mobile computing device, a plurality of content cards eligible to be displayed in the one or more areas;
  generating a user-specific content classification model for selecting one of the plurality of content cards to be displayed in the one or more areas, comprising:
    identifying, by the mobile computing device, historical usage characteristics associated with the application and transmitting the historical usage characteristics to a server computing device,
    generating, by the server computing device, the user-specific content classification model based upon the historical usage characteristics, and
    transmitting, by the server computing device, the user-specific content classification model to the mobile computing device;
  executing, by the mobile computing device, the user-specific content classification model to select one or more of the plurality of content cards to be displayed in the one or more areas; and
  launching, by the mobile computing device, the application based upon the request, wherein the application displays the selected one or more content cards in the one or more areas upon launching.

2. The method of claim 1, wherein the historical usage characteristics comprise an identification of a current content card displayed in the application, a location of the mobile computing device when the current content card is displayed in the application, a date when the current content card is displayed in the application, a time of day and a day of the week when the current content card is displayed in the application, an amount of time that the current content card is displayed in the application, a view type associated with the current content card displayed in the application, or an identification of a content card to be displayed next in the application.

3. The method of claim 1, wherein the historical usage characteristics are derived from one or more log files stored on the mobile computing device.

4. The method of claim 1, wherein generating a user-specific content classification model based upon the historical usage characteristics comprises:
  determining a baseline classification model based upon an identify of a user of the mobile computing device, the baseline classification model associated with a plurality of users that have one or more characteristics in common with the user of the mobile computing device;
  modifying the baseline content classification model to remove an output layer of the baseline classification model and insert a new output layer comprising randomized values in place of the removed output layer; and
  re-training the baseline content classification model using the historical usage characteristics to generate the user-specific content classification model.

5. The method of claim 1, wherein the user-specific content classification model is a wide and deep model.

6. The method of claim 1, wherein executing the user-specific content classification model generates a selection of a content card predicted to have a highest user interaction probability.

7. The method of claim 6, wherein the content card predicted to have the highest user interaction probability is selected for display in the one or more areas of the application.

8. The method of claim 1, further comprising:
capturing, by the mobile computing device, usage characteristics associated with the application when the selected one or more content cards are displayed in the application;
transmitting, by the mobile computing device, the usage characteristics to the server computing device; and
re-training, by the server computing device, the user-specific content classification model using the usage characteristics.

9. The method of claim 8, wherein the usage characteristics comprise an identification of the selected one or more content cards displayed in the application, a location of the mobile computing device when the selected one or more content cards are displayed in the application, a date when the selected one or more content cards are displayed in the application, a time of day when the selected one or more content cards are displayed in the application, a day of the week when the selected one or more content cards are displayed in the application, an amount of time that the selected one or more content cards are displayed in the application, a view type associated with the selected one or more content cards displayed in the application, or an identification of a content card to be displayed next in the application.

10. The method of claim 1, wherein the plurality of content cards eligible to be displayed in the one or more areas comprise a ranked list of the plurality of content cards.

11. The method of claim 1, further comprising:
selecting, by the mobile computing device, another one or more content cards for display in the one or more areas after a predetermined time has elapsed during use of the application; and
displaying, by the mobile computing device, the another one or more content cards in the one or more areas.

12. A system for generating and displaying custom-selected content for a mobile device application, the system comprising:
a mobile computing device comprising a memory for storing computer-executable instructions and a processor that executes the computer-executable instructions; and
a server computing device coupled to the mobile computing device and comprising a memory for storing computer-executable instructions and a processor that executes the computer-executable instructions;
wherein the mobile computing device:
captures a request to launch an application located on the mobile computing device, the application comprising one or more areas to display custom-selected content;
determines a plurality of content cards eligible to be displayed in the one or more areas;
identifies historical usage characteristics associated with the application and transmits the historical usage characteristics to the server computing device,
executes a user-specific content classification model received from the server computing device to select one or more of the plurality of content cards to be displayed in the one or more areas; and
launches the application based upon the request, the application displaying the selected one or more content cards in the one or more areas upon launching; and wherein the server computing device:
generates the user-specific content classification model based upon the historical usage characteristics received from the mobile computing device; and
transmits the user-specific content classification model to the mobile computing device.

13. The system of claim 12, wherein the historical usage characteristics comprise an identification of a current content card displayed in the application, a location of the mobile computing device when the current content card is displayed in the application, a date when the current content card is displayed in the application, a time of day and a day of the week when the current content card is displayed in the application, an amount of time that the current content card is displayed in the application, a view type associated with the current content card displayed in the application, or an identification of a content card to be displayed next in the application.

14. The system of claim 12, wherein the historical usage characteristics are derived from one or more log files stored on the mobile computing device.

15. The system of claim 12, wherein generating a user-specific content classification model based upon the historical usage characteristics comprises:
determining a baseline classification model based upon an identify of a user of the mobile computing device, the baseline classification model associated with a plurality of users that have one or more characteristics in common with the user of the mobile computing device;
modifying the baseline content classification model to remove an output layer of the baseline classification model and insert a new output layer comprising randomized values in place of the removed output layer; and
re-training the baseline content classification model using the historical usage characteristics to generate the user-specific content classification model.

16. The system of claim 12, wherein the user-specific content classification model is a wide and deep model.

17. The system of claim 12, wherein executing the user-specific content classification model generates a selection of a content card predicted to have a highest user interaction probability.

18. The system of claim 17, wherein the content card predicted to have the highest user interaction probability is selected for display in the one or more areas of the application.

19. The system of claim 12, wherein:
the mobile computing device captures usage characteristics associated with the application when the selected one or more content cards are displayed in the application and transmits the usage characteristics to the server computing device; and
the server computing device re-trains the user-specific content classification model using the usage characteristics.

20. The system of claim 19, wherein the live usage characteristics comprise an identification of the selected one or more content cards displayed in the application, a location of the mobile computing device when the selected one or more content cards are displayed in the application, a date when the selected one or more content cards are displayed in the application, a time of day when the selected one or more content cards are displayed in the application, a day of the week when the selected one or more content cards are displayed in the application, an amount of time that the selected one or more content cards are displayed in the application, a view type associated with the selected one or more content cards displayed in the application, or an identification of a content card to be displayed next in the application.

21. The system of claim 12, wherein the plurality of content cards eligible to be displayed in the one or more areas comprise a ranked list of the plurality of content cards.

22. The system of claim 12, wherein the mobile computing device:
  selects another one or more content cards for display in the one or more areas after a predetermined time has elapsed during use of the application; and
  displays the another one or more content cards in the one or more areas.

\* \* \* \* \*